(12) United States Patent
Sader

(10) Patent No.: US 7,514,891 B2
(45) Date of Patent: Apr. 7, 2009

(54) METHOD AND ARRANGEMENT FOR MONITORING A POWER OUTPUT STAGE

(75) Inventor: Frank Sader, Frankfurt am Main (DE)

(73) Assignee: Siemens Aktiengesellschaft, München (DE)

( * ) Notice: Subject to any disclaimer, the term of this patent is extended or adjusted under 35 U.S.C. 154(b) by 342 days.

(21) Appl. No.: 10/558,147

(22) PCT Filed: Apr. 30, 2004

(86) PCT No.: PCT/EP2004/050666

§ 371 (c)(1),
(2), (4) Date: Nov. 21, 2005

(87) PCT Pub. No.: WO2004/105206

PCT Pub. Date: Dec. 2, 2004

(65) Prior Publication Data

US 2007/0035976 A1 Feb. 15, 2007

(30) Foreign Application Priority Data

May 23, 2003 (DE) ................................. 103 23 908

(51) Int. Cl.
*H02P 6/12* (2006.01)
(52) U.S. Cl. ...................................... 318/434; 318/439
(58) Field of Classification Search ......... 318/432–434, 318/804, 815, 819, 903
See application file for complete search history.

(56) References Cited

U.S. PATENT DOCUMENTS

| 4,712,050 A | * | 12/1987 | Nagasawa et al. | ...... 318/400.04 |
| 4,900,993 A | * | 2/1990 | Yasohara et al. | ....... 318/400.04 |
| 5,721,474 A | * | 2/1998 | Lee et al. | .................... 318/434 |
| 6,153,993 A | | 11/2000 | Oomura et al. | |
| 2002/0074962 A1 | | 6/2002 | Moddemann | |
| 2002/0105239 A1 | | 8/2002 | Witzig | |

FOREIGN PATENT DOCUMENTS

| JP | 58-035608 | 3/1983 |
| JP | 08-066081 | 3/1996 |
| JP | 11122941 | 4/1999 |

OTHER PUBLICATIONS

English translation of the Office Action for the corresponding Japanese Patent Application.
International Preliminary Examination Report dated Jul. 1, 2005 issued in Application No. PCT/EP2004/050666.
International Search Report dated Aug. 10, 2004 issued in Application No. PCT/EP2004/050666.

* cited by examiner

*Primary Examiner*—Rajnikant B Patel
(74) *Attorney, Agent, or Firm*—Cohen Pontani Lieberman & Pavane LLP

(57) ABSTRACT

The invention relates to a method and arrangement for monitoring a power output stage, whereby the power output stage has at least one half bridge, comprising a series circuit of two semiconductor switches supplied with an operating voltage. The semiconductor switches may be alternately controlled in a conducting state and a non-conducting state, by means of pulse-width modulated pulses and the connection point of the semiconductor switch of the at least one half bridge forms an output. According to the invention, each pulse width of the signals at the output is compared with a relevant set pulse width and the power output stage is recognised as fault-free when deviations do not exceed a given magnitude.

12 Claims, 2 Drawing Sheets

METHOD AND ARRANGEMENT FOR MONITORING A POWER OUTPUT STAGE

PRIORITY CLAIM

This is a U.S. national stage of application No. PCT/EP2004/050666, filed on 30 Apr. 2004. Priority is claimed on the following application: Country: Germany, Application No.: 103 23 908.1, Filed: 23 May 2003.

BACKGROUND OF THE INVENTION

The invention relates to a method and an arrangement for monitoring a power output stage, the power output stage having at least one half-bridge, which comprises a series circuit comprising two semiconductor switches and has an operating voltage applied to it, it being possible for the semiconductor switches to be controlled alternately into an on state and an off state by pulse width-modulated pulses, and the junction point between the semiconductor switches of the at least one half-bridge forming an output.

It is necessary, in particular for safety-relevant applications in motor vehicles, for example for electrically assisted steering, to detect any fault which may lead to a hazardous state. In the case of electrically assisted steering systems, DC or EC motors are used for providing assistance which are controlled via an H bridge or a B6 bridge by applying pulse width-modulated pulses to the half-bridges. The semiconductor switching elements, usually MOSFETs, are driven by a control device (microcontroller or digital signal processor). For fault detection, continuous monitoring of the rms voltages applied at the output is necessary.

SUMMARY OF THE INVENTION

An object of the present invention is to reliably monitor a power output stage with as little complexity as possible, so that faults which may lead, in particular, to a hazardous state are detected.

The object is achieved in the method according to the invention by the fact that a respective pulse width of the signal produced at the output is compared with a respective desired pulse width, and that the power output stage is recognized as being fault-free if discrepancies do not exceed a prescribed level.

One advantage of the invention is the fact that it is possible in a simple manner to monitor the entire circuit from the outputs of the control device via drive circuits (driver modules) and semiconductor switches of the bridges. Since monitoring manages without integrating elements, which would be necessary, for example, when measuring the mean value of the output voltages, evaluation is possible quickly and with only low tolerance ranges and thus with high accuracy. This means, in turn, increased reliability.

The method according to the invention preferably provides for the comparison to take place in a processor, which also produces the pulses to be supplied to the semiconductor switches. This makes a particularly simple and reliable hardware solution possible. In some processors, a so-called gated counter is already provided, with which the different pulse widths can be determined. The remaining method steps can easily be carried out by slightly modifying the program existing in the control device in any case.

The technology used in control devices of this type generally does not permit voltages which are higher than 5 V. Therefore, one development of the method according to the invention provides for the signals at the at least one output to be matched to the processor with respect to the level.

In order to rule out steady-state fluctuations during monitoring, one development may provide for the desired pulse width and the pulse width of the output signals of in each case a plurality of periods to be evaluated during the comparison.

Another development consists in the fact that the comparison takes place if the pulse widths are constant over a period of time required for measuring the pulse width of the output signals. As a result, the computational complexity for the comparison and the evaluation can be stored at a time at which the remaining programs of the control device are less active. This can also be achieved by the fact that the comparison takes place if the pulse widths change in a known manner over a period of time required for measuring the pulse width of the output signals.

In one arrangement according to the invention, the object is achieved by the fact that the signal at the at least one output can be supplied to an input of a comparison device, which is designed for comparing the pulse width of the signal with the pulse width of the pulse. A particularly simple comparison is possible in the arrangement according to the invention by the fact that the comparison device is part of a control device, which produces the pulses which can be supplied to control inputs of the semiconductor switches via drive circuits. In addition, this measure increases the reliability of fault detection.

The arrangement according to the invention may also provide for a level-matching circuit to be arranged between the at least one output and the input of the control device.

BRIEF DESCRIPTION OF THE DRAWINGS

The invention permits numerous embodiments. One of these is illustrated schematically in the drawing using a plurality of figures and will be described below. In the drawings.

DETAILED DESCRIPTION OF THE PREFERRED EMBODIMENTS

Figure 1:
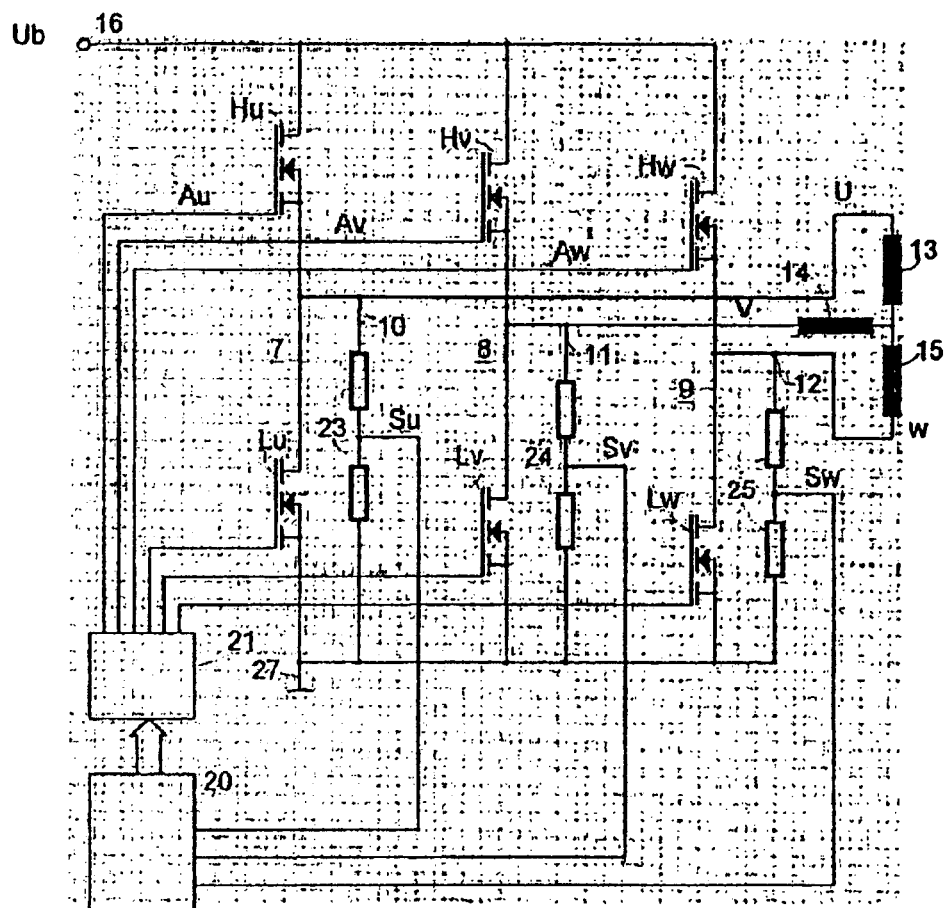
FIG. 1 is a circuit diagram of one exemplary embodiment,
FIG. 2 includes graphs of signals in the exemplary embodiment shown in FIG. 1.

In the exemplary embodiments illustrated, two MOSFETs Hu, Lu; Hv, Lv; Hw, Lw form in each case a half-bridge 7, 8, 9 having outputs 10, 11, 12, to which in each case one of the star-connected windings 13, 14, 15 of a brushless permanently excited synchronous motor is connected. The operating voltage Ub is supplied to an input 16.

The arrangement also comprises a control device 20, which is known per se in the context of power output stages. The control device 20 is formed by a microcomputer or a digital signal processor and does not need to be explained in any more detail as such in order to illustrate the invention. Outputs of the control device 20 are connected to a drive circuit 21 which produces control signals Au, Av, Aw for the MOSFETs Hu to Lw. The control device 20 also has inputs, which can be supplied with voltages produced by in each case one voltage divider 23, 24, 25. The voltage dividers have substantially higher resistance values than the windings 13, 14, 15 in order not to impair the efficiency of the output stage during operation.

The pulses supplied to the drive circuit 21 by the control device 20 are generally derived from clock pulses, which have a substantially higher frequency than the repetition frequency of the drive pulses. It is therefore also established in the control device how many clock pulses wide the respective pulse is. If, in the exemplary embodiment shown in FIG. 1, the number of clock pulses is counted from the front edge to the rear edge of the signal Su, Sv and Sw to be tested in each case, this number can easily be compared. This takes account of any tolerances which are dependent on switching times of the drive circuit 21 and the semiconductor switches.

Figure 2:
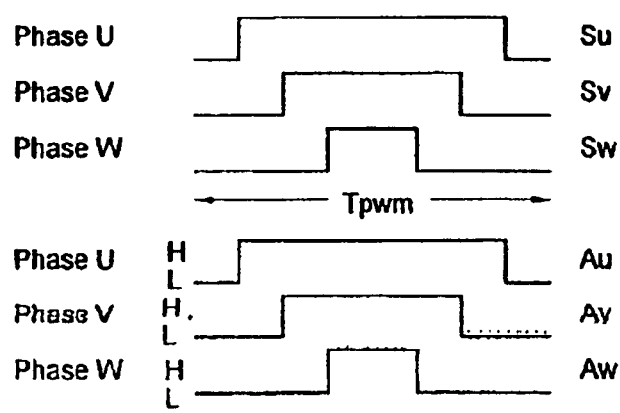

FIG. 2 shows driving of the semiconductor switches, which form the three phases U, V, W, such that the respective upper semiconductor switch is on at a level H, while the lower semiconductor switch is controlled into the on state at a level L. In addition, the three signals Su, Sv and Sw are illustrated schematically. In each case three periods are shown, whose duration is, for example, 50 µs, which corresponds to a frequency of 20 kHz. Since this frequency is considerably higher than that of the rotating field, the width modulation forming the rotating field cannot be seen in FIG. 2. FIG. 2 represents, so to speak, an instantaneous recording in which the interval of the level H is at its greatest in the phase U and at its smallest in the phase W, while the interval of the level L is at its smallest in the phase U and at its largest in the phase W. During correct operation, the pulse widths Au, Su, Av, Sv, Aw, Sw are essentially the same.

Discrepancies, which are also to be understood as complete omission of a pulse, are interpreted as a defect.

Figure 3:
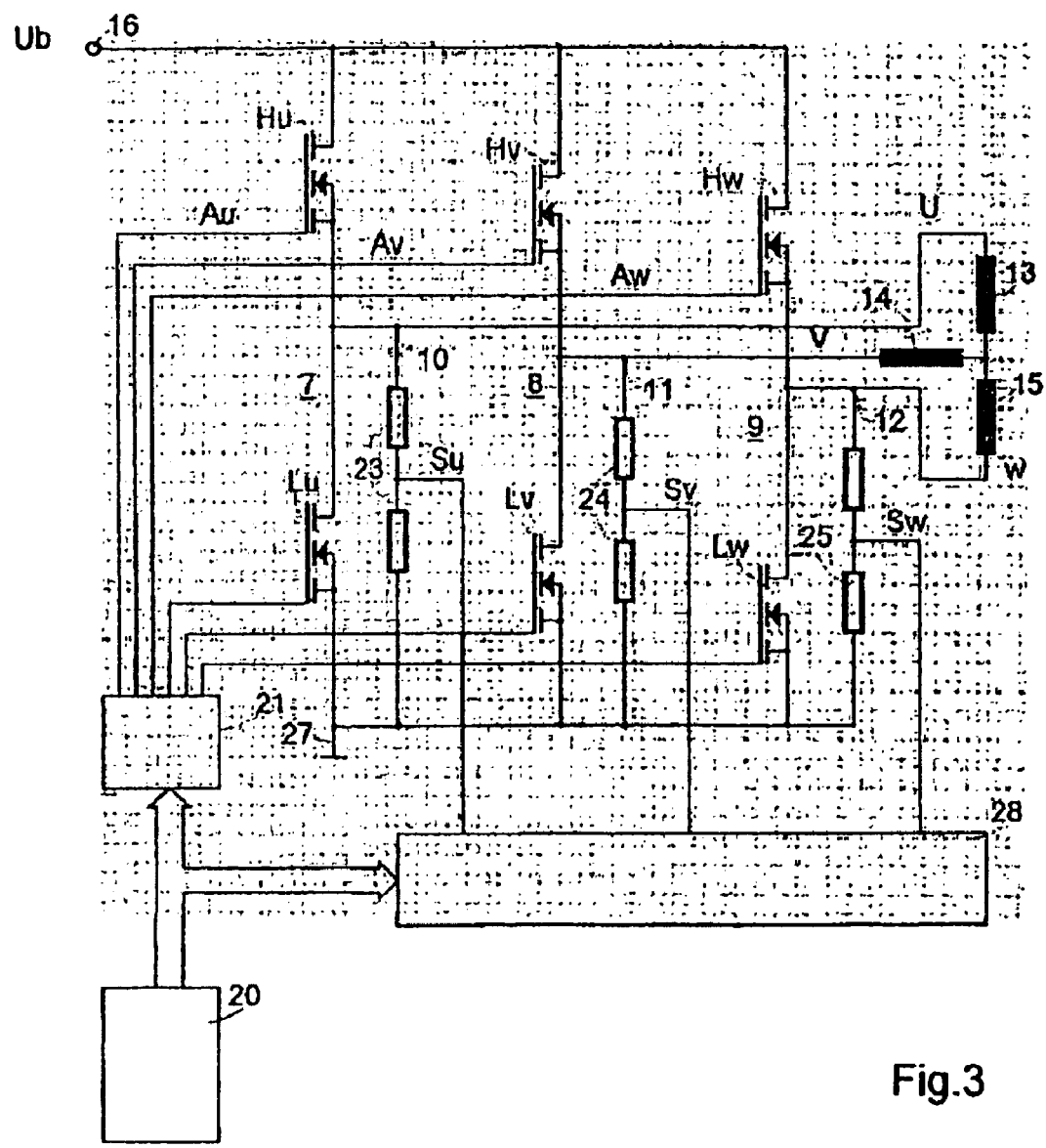
FIG. 3 is a circuit diagram of a further exemplary embodiment.

In the exemplary embodiment shown in FIG. 3, a separate comparison device 28 is provided, which is supplied, on the one hand, the output signals Su, Sv and Sw via voltage dividers—as in the first exemplary embodiment—and, on the other hand, drive signals produced by the control device. There are various technologies available for the comparison device 28, for example a permanently wired circuit or a programmable device, such as a microprocessor.

What is claimed is:

1. A method for monitoring a power output stage having at least one half bridge with a series circuit including two semiconductor switches, an operating voltage being applied to the series circuit, the semiconductor switches being alternately switched to an on state and an off state by pulse width modulated pulses, wherein a junction point between the semiconductor switches of the at least one half bridge forms an output signal, said method comprising the steps of:

comparing a pulse width of the output signal to a desired pulse width; and determining that the power output stage is fault-free if a difference between the pulse width of the output signal and the desired pulse width for each at least one half bridge is less than a prescribed level.

2. The method of claim 1, wherein said step of comparing is performed in a processor that produces the pulse width modulated pulses supplied to the semiconductor switches.

3. The method of claim 2, wherein a level of the output signal is matched to a level of the desired pulse width in said step of comparing.

4. The method of claim 1, wherein said step of comparing comprises comparing a pulse width for a plurality of periods of the output signal to a desired pulse width for the plurality of periods.

5. The method of claim 1, wherein said step of comparing is performed if the pulse widths of the output signal are constant over a period of time required for measuring the pulse width of the output signal.

6. The method of claim 1, wherein said step of comparing is performed if the pulse widths of the output signal change in a known manner over a period of time required for measuring the pulse width of the output signal.

7. The method of claim 1, wherein the desired pulse width comprises a width of the pulse width modulated pulses.

8. An arrangement for monitoring a power output stage, the power output stage comprising:

at least one half-bridge comprising a series circuit comprising two semiconductor switches, the series circuit being connectable to an operating voltage, the semiconductor switches being alternately switchable to an on state and an off state by a pulse width modulated pulse signal a junction point between the semiconductor switches of the at least one half bridge forming an output; and a comparison device configured for receiving the output of the at least one half bridge and the pulse width modulated pulse signal, and for comparing a pulse width of the output of the at least one half bridge to a pulse width of the pulse width modulated pulse signal.

9. The arrangement of claim 8, wherein said comparison device comprises a part of a control device which produces the pulse width modulated pulse signal.

10. The arrangement of claim 8, further comprising a level-matching circuit arranged between said comparison device and the junction point between the semiconductor switches of the at least one half bridge for matching a level of the output signal to a level of the pulse width modulated pulse signal.

11. The arrangement of claim 8, wherein the output of the at least one half bridge is connected to a winding of a motor for driving the motor.

12. The method of claim 1, wherein the output of the at least one half bridge is connected to a motor winding for driving a motor.

* * * * *